(12) United States Patent
Kaneko et al.

(10) Patent No.: US 7,628,332 B2
(45) Date of Patent: Dec. 8, 2009

(54) EXTERNAL UNIT FOR STORAGE-MEDIUM STORAGE DEVICE

(75) Inventors: Hidetaka Kaneko, Kawasaki (JP); Osamu Omori, Kawasaki (JP); Yukio Katsuyama, Kawasaki (JP); Yoshio Kotaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 609 days.

(21) Appl. No.: 11/443,203

(22) Filed: May 31, 2006

(65) Prior Publication Data

US 2007/0175993 A1 Aug. 2, 2007

(30) Foreign Application Priority Data

Jan. 31, 2006 (JP) ............................. 2006-023847

(51) Int. Cl.
*G06K 19/06* (2006.01)
(52) U.S. Cl. .................. 235/491; 235/487; 235/462.46; 235/472.02; 360/60; 360/69; 360/72.3
(58) Field of Classification Search ............ 235/462.46, 235/472.02, 491, 487; 360/60, 69, 72.3
See application file for complete search history.

(56) References Cited

U.S. PATENT DOCUMENTS

| 6,710,962 | B1 * | 3/2004 | Caverly et al. ................. 360/69 |
| 2003/0039051 | A1 * | 2/2003 | Taki et al. ..................... 360/69 |
| 2003/0067701 | A1 * | 4/2003 | Christie, Jr. .................. 360/60 |
| 2004/0190179 | A1 * | 9/2004 | Kato et al. ..................... 360/69 |

FOREIGN PATENT DOCUMENTS

| JP | 4-216361 | 8/1992 |
| JP | 7-121952 | 5/1995 |

OTHER PUBLICATIONS

"Eternus F6476M/S Tape Device", (http://storage-system.fujitsu.com/jp/products/tape.f6476ms/), Jan. 16, 2006.

* cited by examiner

*Primary Examiner*—Michael G Lee
*Assistant Examiner*—Kristy A Haupt
(74) *Attorney, Agent, or Firm*—Staas & Halsey LLP

(57) ABSTRACT

An external unit is externally attached to a storage-medium storage device. The external unit includes a verification unit that verifies whether a storage medium that is about to be inserted in a storage slot of the storage-medium storage device is legitimate, and an open/close unit that opens the storage slot so that the storage medium can be inserted in the storage slot only upon the verifying unit verifying that the storage medium is legitimate.

5 Claims, 17 Drawing Sheets

MAGNETIC TAPE DEVICE

STORAGE SLOT

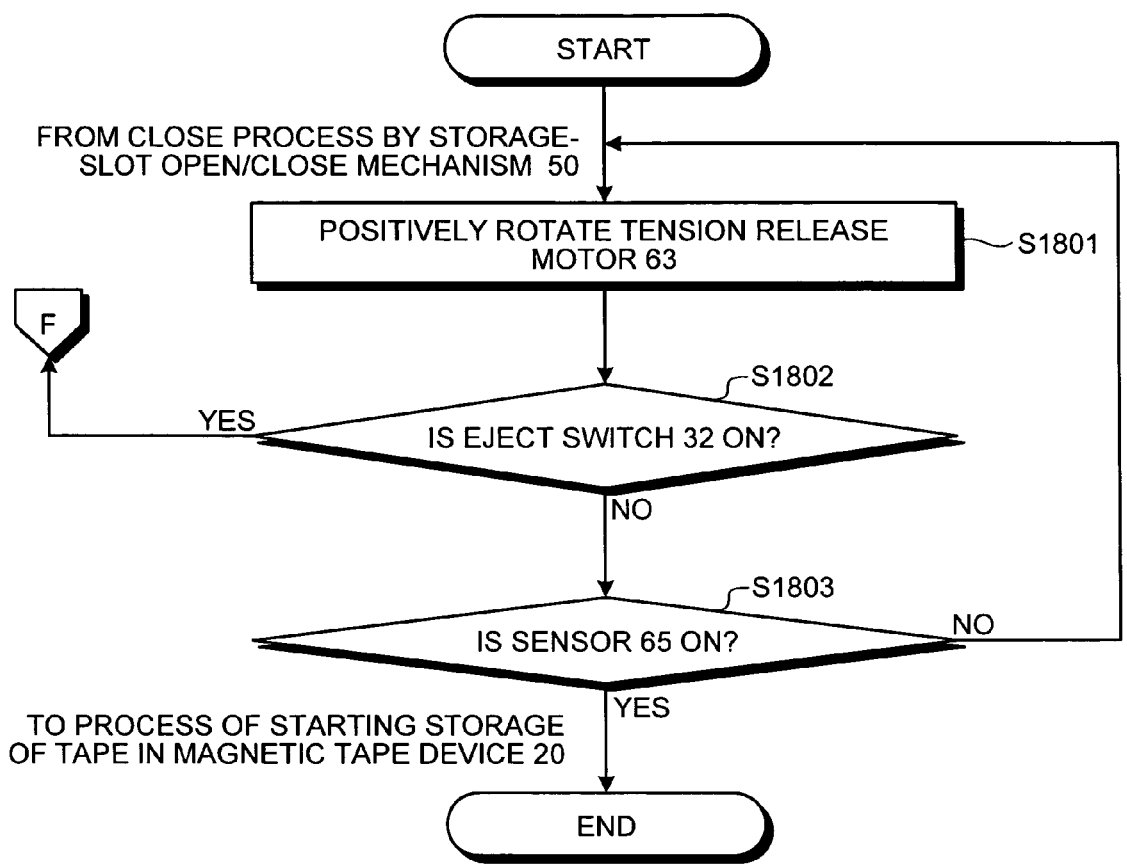

EXTERNAL UNIT FOR STORAGE-MEDIUM STORAGE DEVICE

BACKGROUND OF THE INVENTION

1. Field of the Invention

The present invention generally relates to storing a storage medium in a storage-medium storage device and specifically relates to not allowing storing of a storage medium that is not legitimate.

2. Description of the Related Art

There have been know storage-medium storage devices that store one or more storage media in dedicated storage slots and transmit information present in the storage medium to a computer. Conventional storage-medium storage devices have been configured to store any storage media that has a specific shape that fits into the storage slot. For example, "ETERNUS F6476M/S Tape device", at web address http://storage-system.fujitsu.com/jp/products/tape/f6476ms/ (existence confirmed on Jan. 16, 2006), discloses a magnetic tape device which stores magnetic tape cartridges in 36-track recording format (based on ISO/IEC 14251, X6135, INCITS 261-1996).

In the conventional storage-medium storage devices, thus, any storage media that fits in the storage slot can be stored in the storage-medium storage device. Some of the storage media, however, may not be legitimate. For example, the storage medium may be created by an authorized creator or may be forged, or the storage medium may include malicious code. If a non-legitimate storage medium is stored in the storage-medium storage device, it can cause problems.

One approach could be to provide a function for determining legitimacy of a storage medium in a storage-medium storage device and not allowing storage of a non-legitimate storage media. However, storage-medium storage devices must be remodeled to provide such a function so that this approach is practically impossible. Moreover, such a function can not be provided in existing storage-medium storage devices.

SUMMARY OF THE INVENTION

It is an object of the present invention to at least partially solve the problems in the conventional technology.

According to an aspect of the present invention, an external unit that can be externally attached to a storage-medium storage device, wherein the storage-medium storage device includes a storage slot for inserting a storage medium and a storage mechanism for storing the storage medium inserted from the storage slot, includes a verification unit that verifies whether a storage medium that is about to be inserted in the storage slot of the storage-medium storage device is legitimate; and an open/close unit that opens the storage slot so that the storage medium can be inserted in the storage slot only upon the verifying unit verifying that the storage medium is legitimate.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 18 is a flowchart of a procedure for a hold release process performed by the storage-medium conveying mechanism.

DETAILED DESCRIPTION OF THE PREFERRED EMBODIMENTS

Exemplary embodiments of the present invention are explained in detail below with reference to the accompanying drawings.

Explanation of those as follows is given in the following order: main terms used in the present invention (1: Explanation of terms), an overview and features of the external unit for a storage-medium storage device according to one embodiment (2: Overview and features of external unit), and a structure and a process flow of the external unit for a storage-medium storage device (3: Structure of external unit, 4: Processes performed by external unit). And then, the explanation is ended with various modifications of the embodiment.

1: Explanation of Terms

Figure 1:
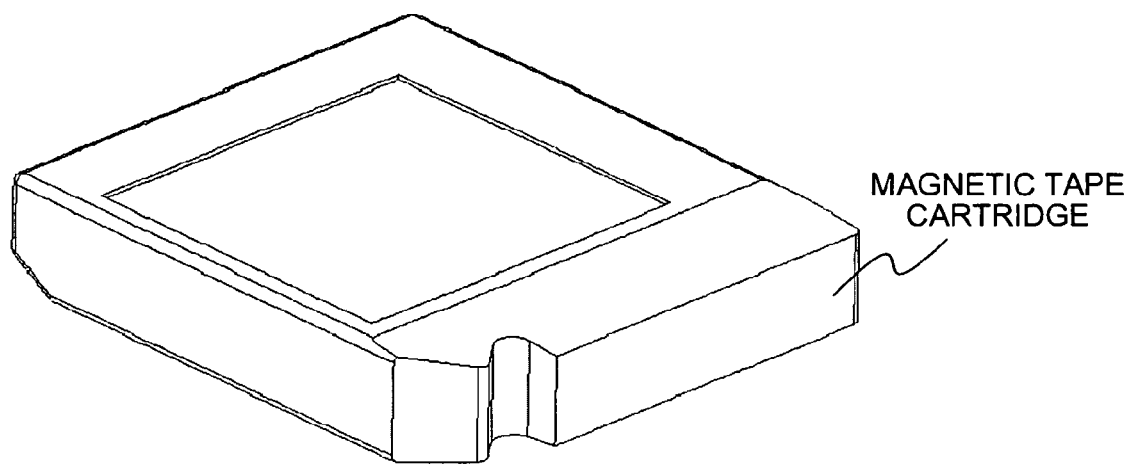
FIG. 1 is a perspective of a typical a magnetic tape cartridge.
Figure 2:
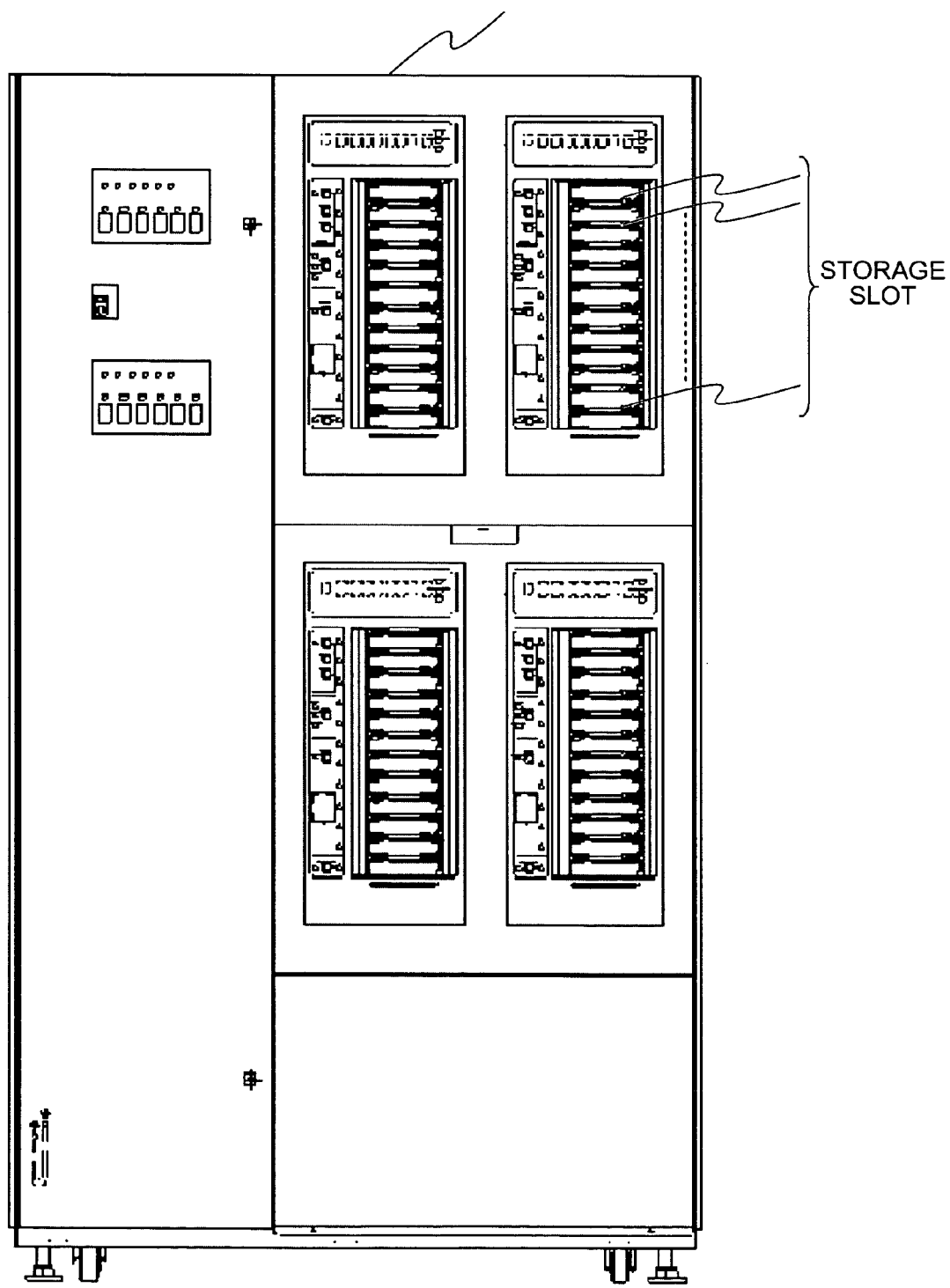
FIG. 2 is a front view of a typical magnetic tape device for storing the magnetic tape cartridge shown in FIG. 1.

Main terms used in a first embodiment of the present invention are explained first. "Magnetic tape cartridge" (which is a storage medium) is a type of external storage unit, which has portability, such that a tape coated with a magnetic material is stored in a cassette as shown in FIG. 1. "Magnetic tape device" (which is a storage-medium storage device) is a device that performs read and write operations from and to the magnetic tape cartridge. As shown in FIG. 2, the device is box-shaped having a plurality of storage slots provided on the front of the device for storing magnetic tape cartridges inside the device. The magnetic tape device has a connecting terminal for connecting to the main body of a computer and includes a mechanism for performing read and write operations from and to the magnetic tape cartridge. As shown in FIG. 2, the magnetic tape device has four units (each has 12 storage slots) for storing magnetic tape cartridges.

2: Overview and Features of External Unit

Figure 3:
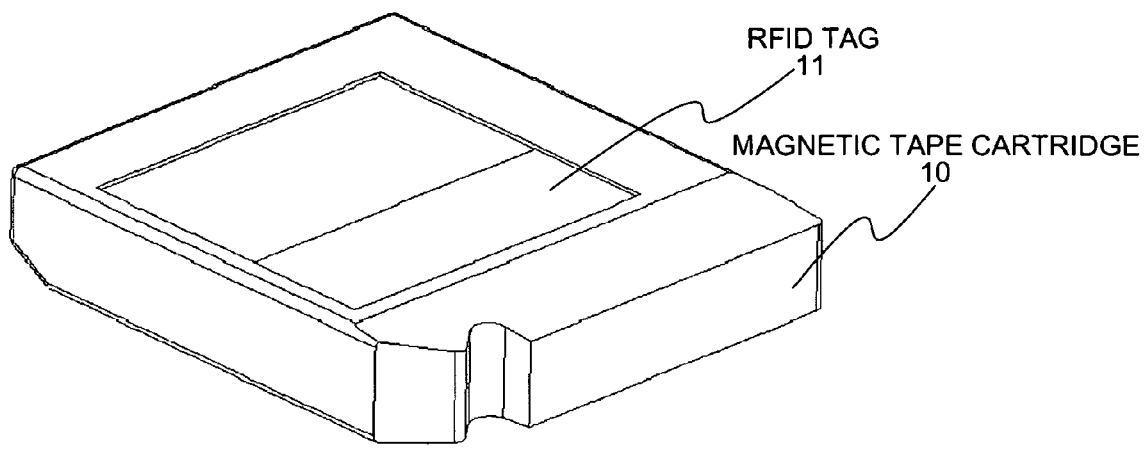
FIG. 3 is a perspective of a magnetic tape cartridge with an RFID tag according to a first embodiment of the present invention.
Figure 4:
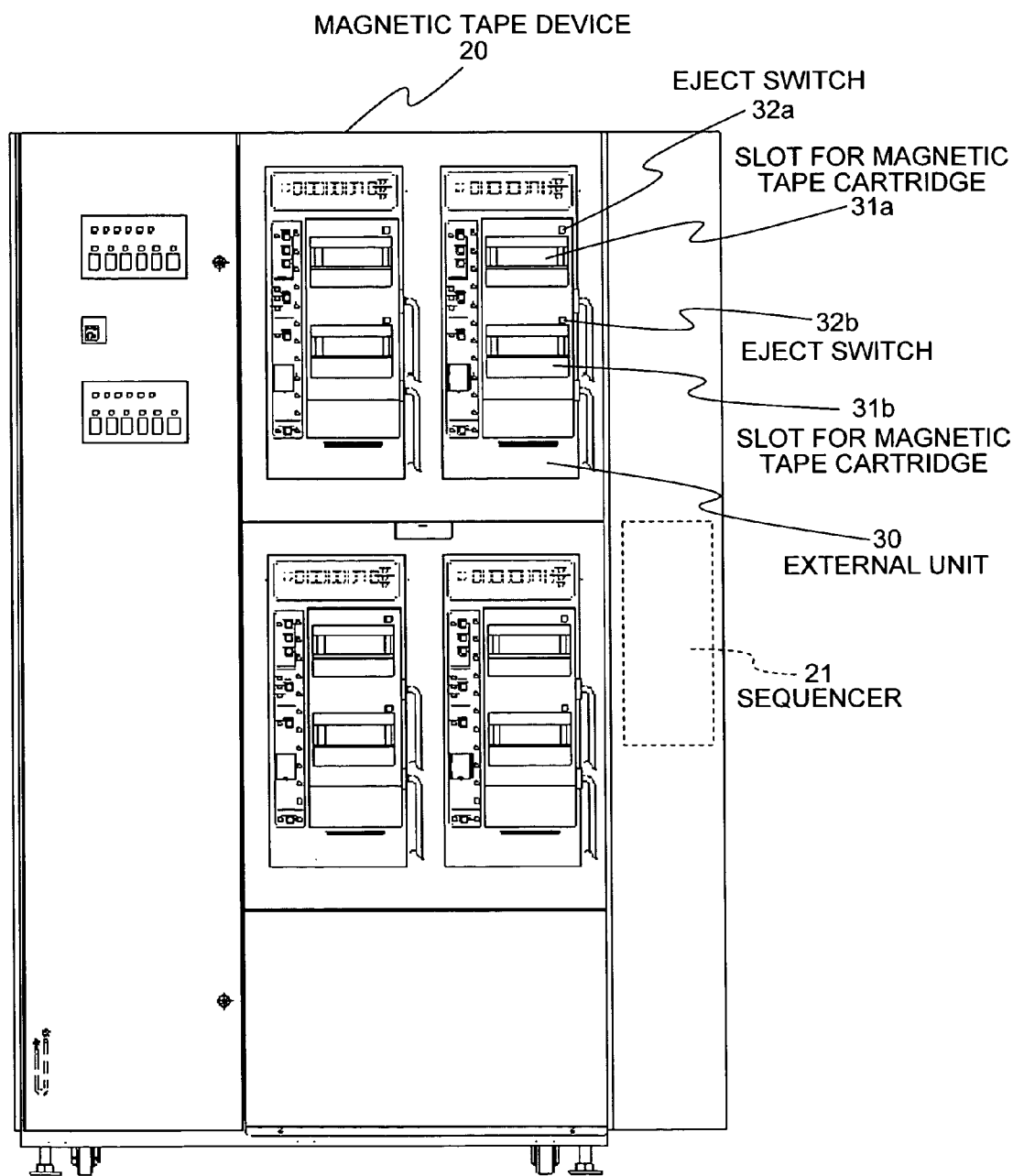
FIG. 4 is a front view of a magnetic tape device equipped with an external unit for a storage-medium storage device according to the first embodiment.
Figure 5:
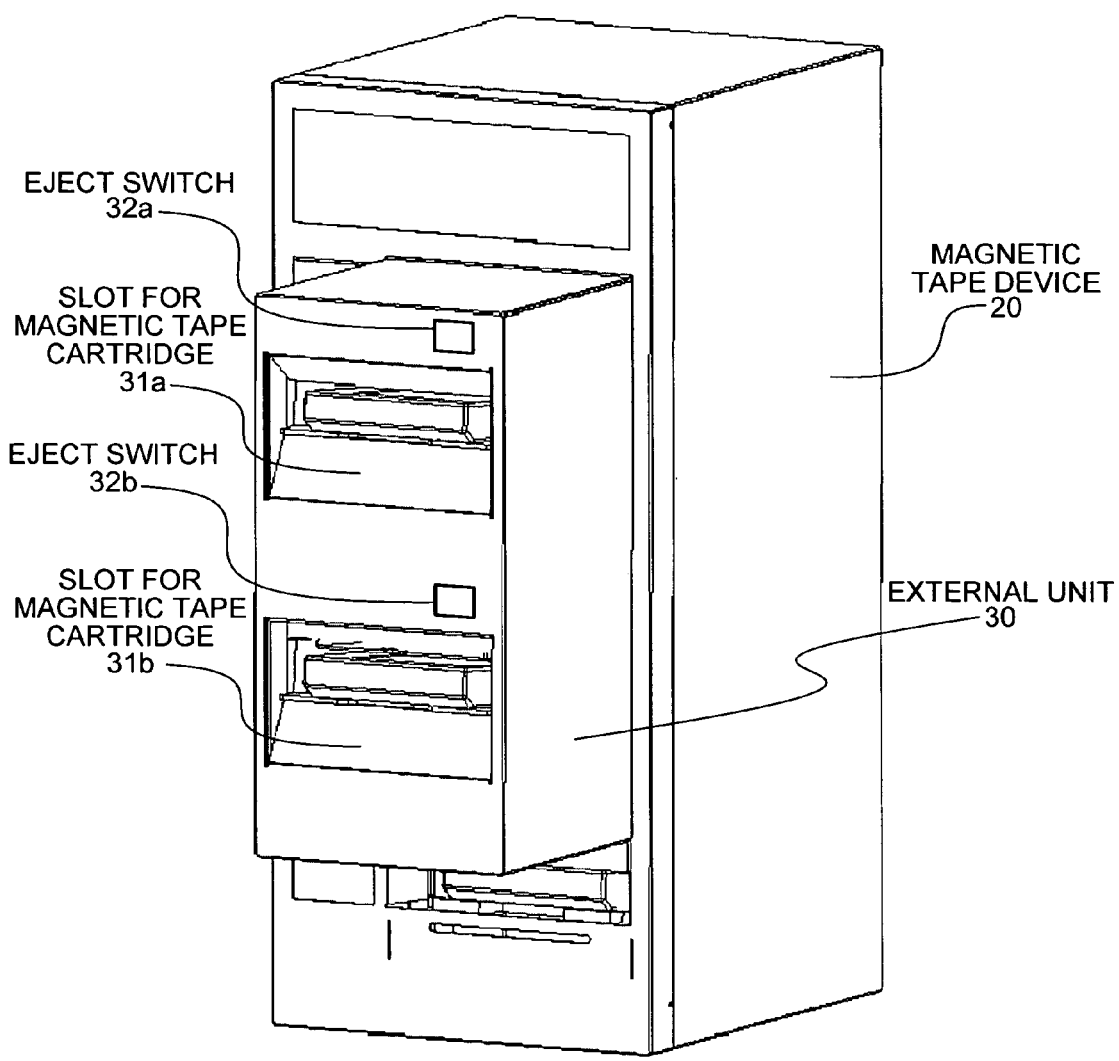
FIG. 5 is a perspective of the magnetic tape device shown in FIG. 4.

The overview and features of the external unit for a storage-medium storage device according to the first embodiment are explained below with reference to FIG. 3 to FIG. 5. FIG. 3 is a perspective of a magnetic tape cartridge with an RFID tag according to a first embodiment of the present invention. FIG. 4 is a front view of a magnetic tape device equipped with an external unit for a storage-medium storage device according to the first embodiment. FIG. 5 is a perspective of the magnetic tape device shown in FIG. 4.

The external unit is externally attached near storage slots of the storage-medium storage device, and has a function for confirming legitimacy of a storage media.

The main feature is briefly explained below. In the first embodiment, as shown in FIG. 3, a radio frequency identification (RFID) tag 11 is mounted on the surface of a magnetic tape cartridge 10. The RFID tag 11 stores data in a medium called "tag" of about several centimeters in size, and includes a mechanism of communicating with a verification device via radio waves or electromagnetic waves. More specifically, the RFID tag 11, which stores individual information for the magnetic tape cartridge 10, is mounted on the magnetic tape cartridge 10, and communicates with the verification device provided in the external unit for the magnetic tape device. This allows the external unit for the magnetic tape device to recognize the individual information for the magnetic tape cartridge 10.

As shown in FIG. 4, an external unit 30 for a magnetic tape device (hereinafter, "external unit 30") is provided near storage slots on the front of a magnetic tape device 20. In FIG. 4, four external units 30 are provided in the magnetic tape device 20, and each of the external units 30 includes two slots 31a and 31b for magnetic tape cartridges and eject switches 32a and 32b corresponding to the respective slots 31a and 31b. A cabinet is attached to the right side of the magnetic tape device 20. The cabinet stores a mechanism (e.g., a sequencer 21) for operating various mechanisms that form the external unit 30.

In FIG. 5, one of the four external units 30 of FIG. 4 is diagonally shown together with a part of the magnetic tape device 20. As shown in FIG. 5, the external unit 30 is a box-shaped unit which has the two slots 31a and 31b for magnetic tape cartridges vertically arranged on the front thereof. The slots 31a and 31b are entries simply for receiving the magnetic tape cartridge 10 to be conveyed to the inside of the external unit 30. These slots are different from the storage slots for storing the magnetic tape cartridges 10 inside the magnetic tape device 20. Therefore, if the magnetic tape cartridges 10 are inserted into the slots 31a and 31b by the user, the slots 31a and 31b receive all of them if the magnetic tape cartridges 10 have a physically allowable shape to pass therethrough. It is noted that because the external unit 30 is externally provided near the storage slots of the magnetic tape device 20, the storage slots cannot be visually recognized in FIG. 5.

Furthermore, as shown in FIG. 5, the external unit 30 has the eject switches 32a and 32b corresponding to the respective slots 31a and 31b. The eject switches 32a and 32b are switches to be pressed for ejecting the magnetic tape cartridge 10 when the user inserts the magnetic tape cartridge 10 into the external unit 30 but stops the process of storing it inside the magnetic tape device 20.

The external unit 30 includes a verification mechanism 40, a storage-slot open/close mechanism 50, and a storage-medium conveying mechanism 60, which are explained later, in the box-shaped unit, but these mechanisms cannot be visually recognized in FIG. 5.

The operation of the external unit 30 is briefly explained below. When the user inserts the magnetic tape cartridge 10 into the slot 31a or 31b, the external unit 30 recognizes the individual information for the magnetic tape cartridge 10 and verifies legitimacy of the magnetic tape cartridge 10 (e.g., determines whether the magnetic tape cartridge is created by an authorized creator) by using the verification mechanism 40. Only when the magnetic tape cartridge 10 is verified to be legitimate, the external unit 30 causes the storage-slot open/close mechanism 50 to open the storage slot, and causes the storage-medium conveying mechanism 60 to convey the magnetic tape cartridge 10 from the storage slot opened to the inside of the magnetic tape device 20.

The external unit 30 can verify the legitimacy of the storage medium and use an existing storage-medium storage device in the above manner. This allows security to be easily ensured without any modification applied to the existing storage-medium storage device as explained about the main feature.

3: Structure of External Unit

Figure 6:
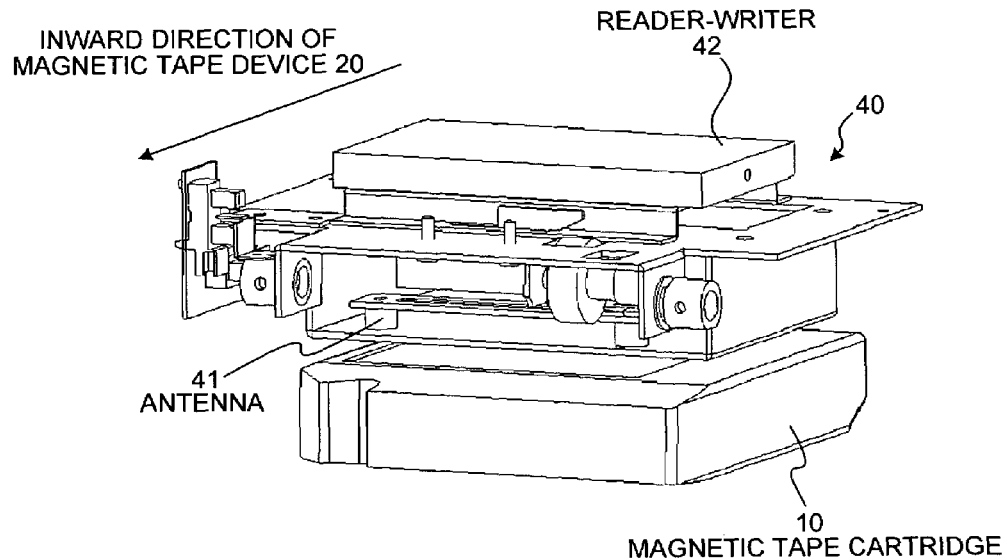
FIG. 6 is a perspective of a verification mechanism.
Figure 7:
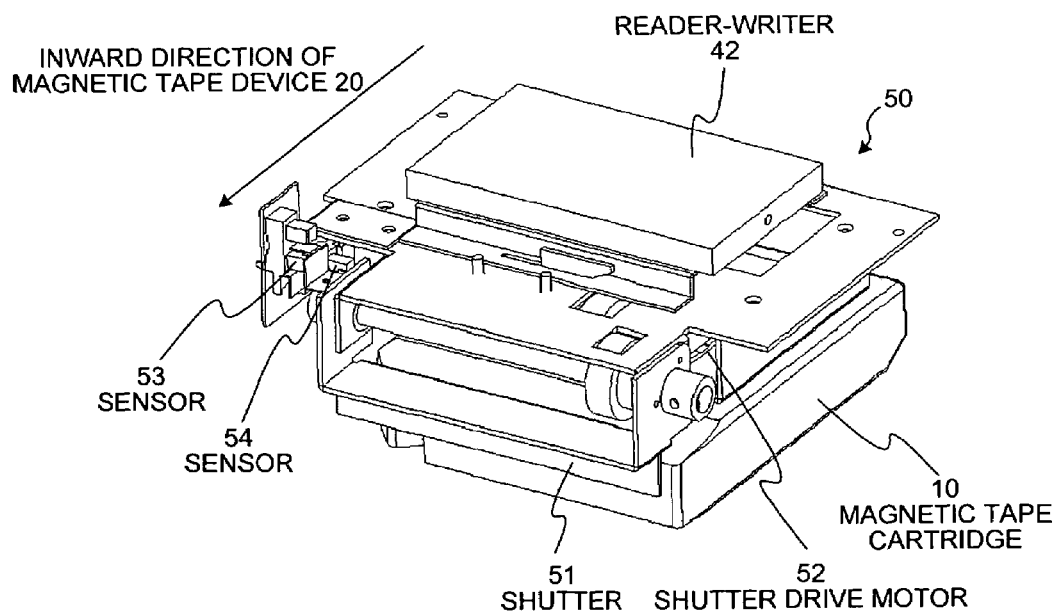
FIG. 7 is a perspective of a storage-slot open/close mechanism.
Figure 8:
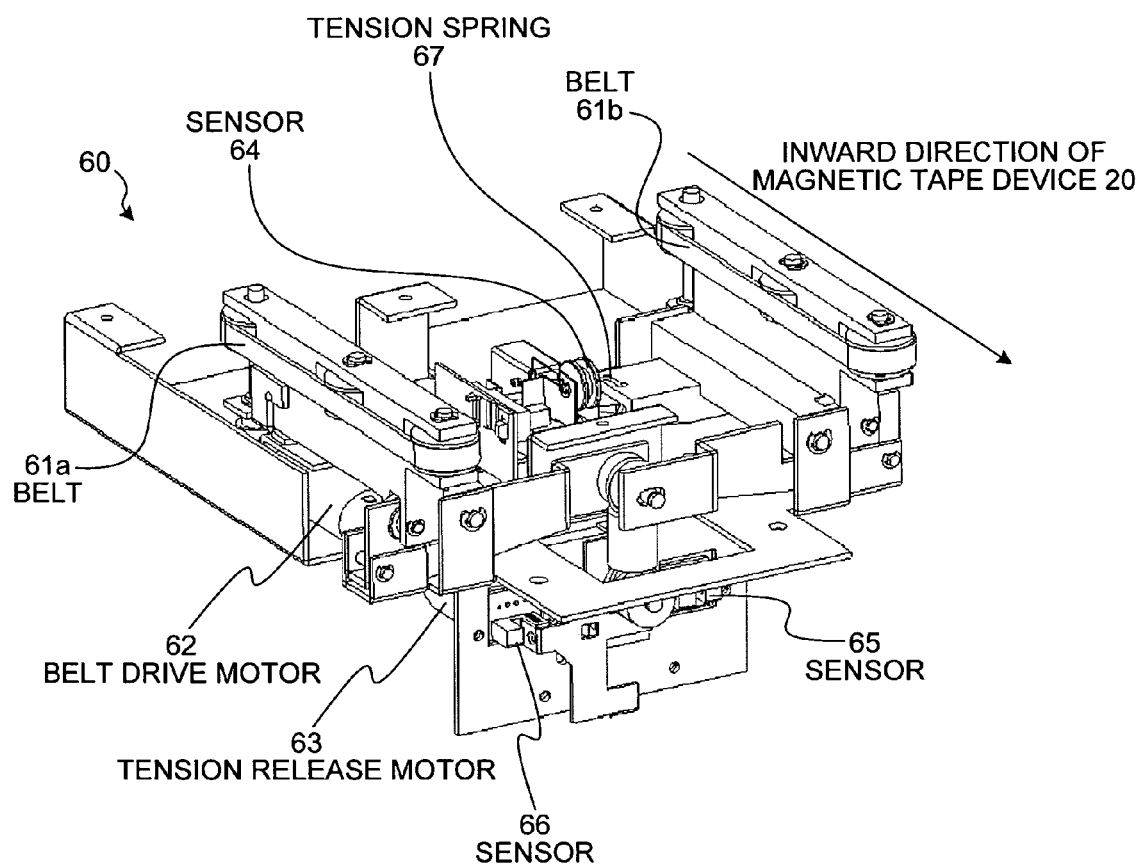
FIG. 8 is a perspective of a storage-medium conveying mechanism.
Figure 9:
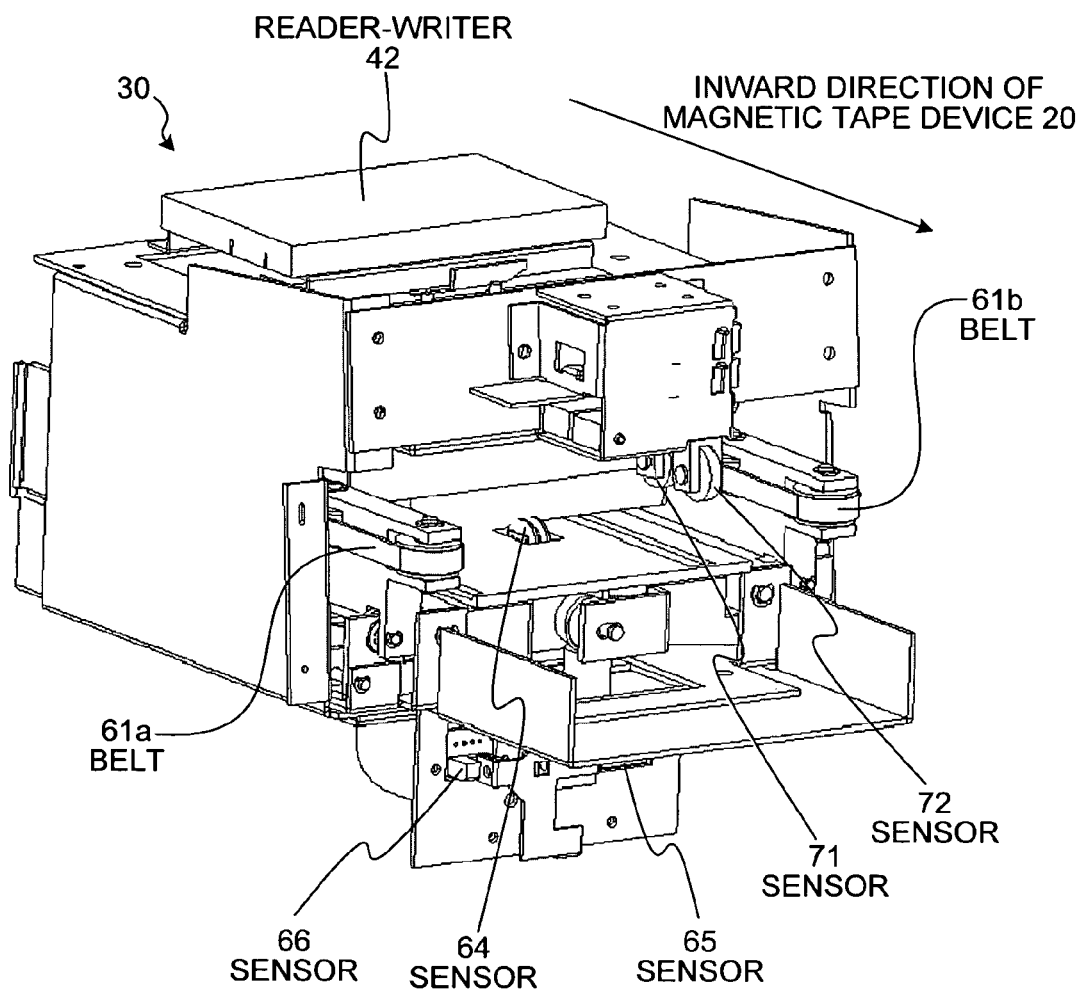
FIG. 9 is a diagram of various mechanisms of the external unit for a storage-medium storage device according to the first embodiment when viewed from their backside.
Figure 10:
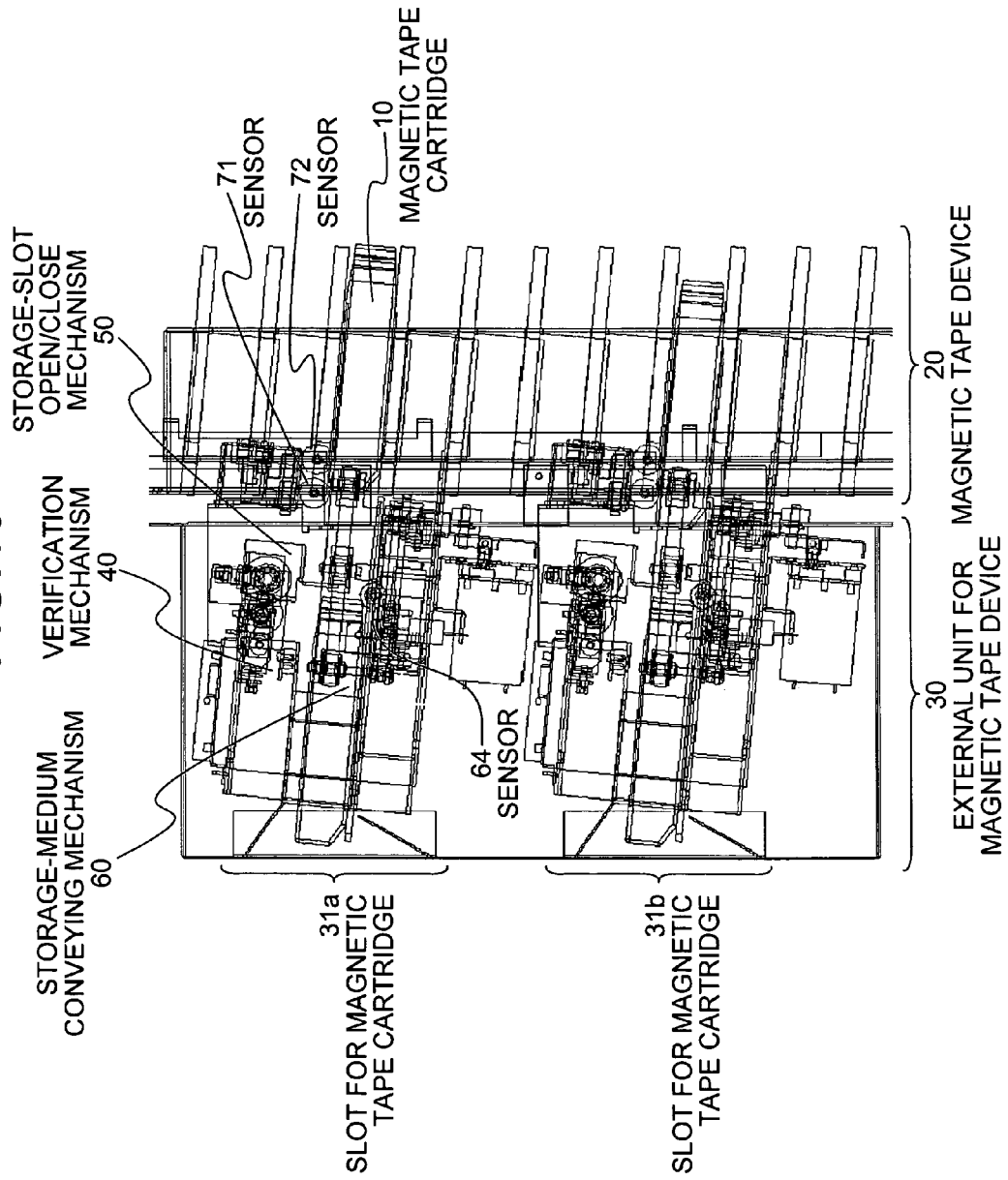
FIG. 10 is a transparent view of the external unit for a storage-medium storage device according to the first embodiment.
Figure 11:
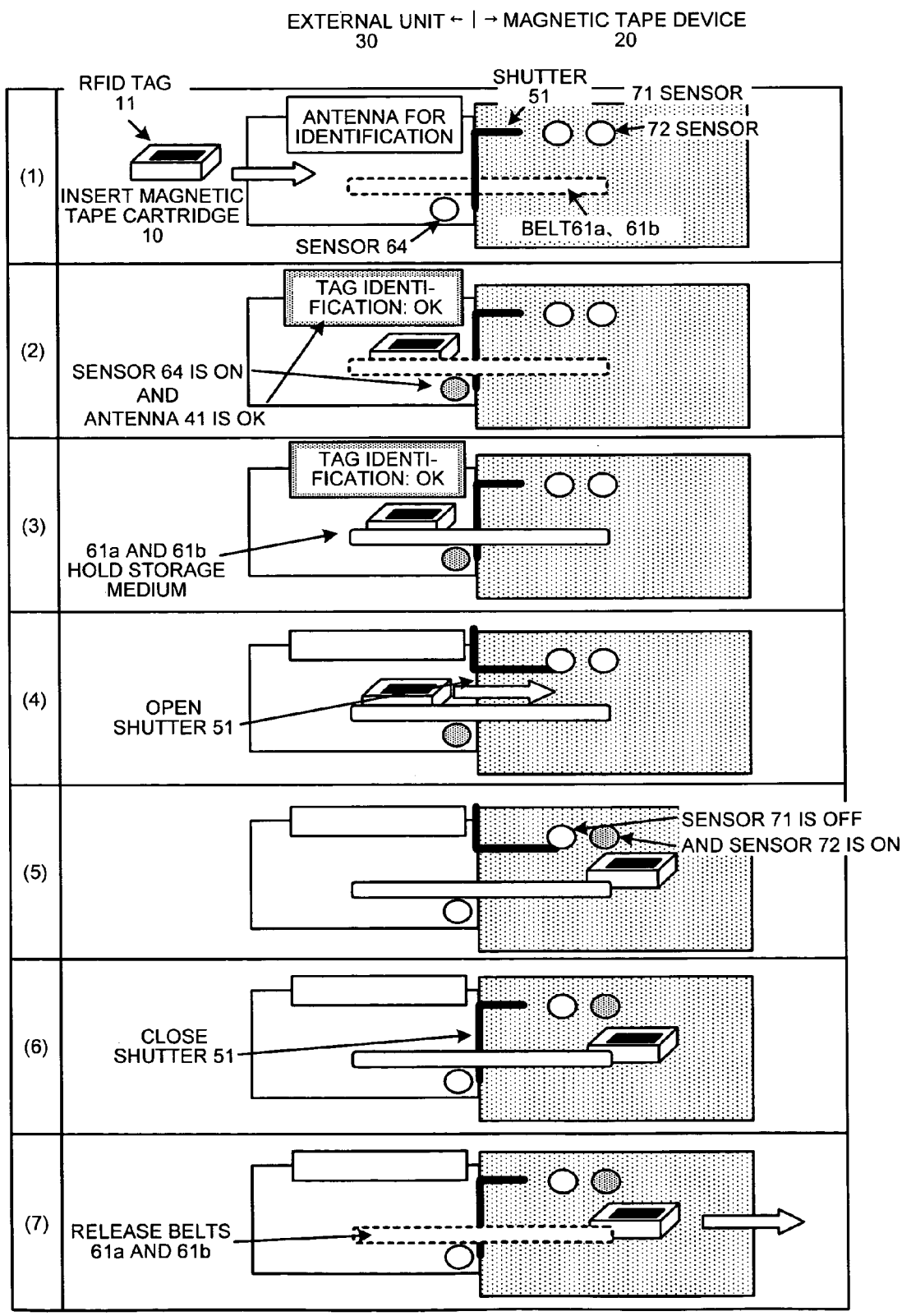
FIG. 11 is a schematic for explaining an operation of the external unit according to the first embodiment.

The structure of the external unit 30 is explained below with reference to FIG. 6 to FIG. 11. FIG. 6 is a perspective of the verification mechanism, FIG. 7 is a perspective of the storage-slot open/close mechanism, and FIG. 8 is a perspective of the storage-medium conveying mechanism. FIG. 9 is a perspective of various mechanisms in the external unit 30 when viewed its backside, FIG. 10 is a transparent view of the external unit 30, and FIG. 11 is a schematic for explaining the operation of the external unit 30.

As shown in FIG. 6, the verification mechanism 40 includes an antenna 41 for communicating with the RFID tag 11 mounted on the magnetic tape cartridge 10 via radio waves or electromagnetic waves; a reader-writer 42 for performing calling, registration, deletion, or update of data stored in the RFID tag 11; and other components. In FIG. 6, an image how the magnetic tape cartridge 10 is inserted in an inward direction of the magnetic tape device 20 indicated by arrow is shown under the verification mechanism 40.

When the magnetic tape cartridge 10 is inserted into the external unit 30, the verification mechanism 40 receives the individual information for the magnetic tape cartridge 10 from the RFID tag 11, and verifies the legitimacy of the magnetic-tape cartridge 10 (e.g., it is created by an authorized creator). More specifically, the verification mechanism 40 verifies the legitimacy by comparing the individual information with individual information previously set by the user, and determining whether these pieces of information match each other.

As shown in FIG. 7, the storage-slot open/close mechanism 50 includes an L-shaped shutter 51 which is a unit of opening and closing the storage slot for storing the magnetic tape cartridge 10 in the magnetic tape device 20, a shutter drive motor 52 for driving the shutter 51, a sensor 53, a sensor 54, and other components. The sensor 53 detects whether the shutter 51 is closed, and the sensor 54 detects whether the shutter 51 is opened. In FIG. 7, an image how the magnetic tape cartridge 10 is inserted in the inward direction of the magnetic tape device 20 indicated by arrow is shown under the storage-slot open/close mechanism 50, but herein, the shutter 51 is closed so that the magnetic tape cartridge 10 is prevented from being conveyed inwardly. Furthermore, the reader-writer 42 corresponds to the reader-writer 42 shown in FIG. 6.

The storage-slot open/close mechanism 50 opens the storage slot only when the magnetic tape cartridge 10 having been inserted into the external unit 30 is verified to be legitimate by the verification mechanism 40. More specifically, the shutter drive motor 52 rotates the L-shaped shutter 51 to thereby open the storage slot.

As shown in FIG. 8, the storage-medium conveying mechanism 60 includes belts 61a and 61b for conveying the magnetic tape cartridge 10, a belt drive motor 62 for driving the belts 61a and 61b, a tension release motor 63, a sensor 64, a sensor 65, a sensor 66, a tension spring 67, and other components. The storage-medium conveying mechanism 60 has a mechanism that the belts 61a and 61b hold the magnetic tape cartridge 10 from its both sides and are rotated by the belt drive motor 62 to thereby convey the magnetic tape cartridge 10 in the inward or the outward direction of the magnetic tape device 20. The tension spring 67 is biased with a spring to apply tension to the side of the magnetic tape cartridge 10, and the tension is released by the tension release motor 63 when the magnetic tape cartridge 10 is conveyed to the inside of the magnetic tape device 20 and transferred to a robot inside the magnetic tape device 20 (the robot for storing the magnetic tape cartridge 10 to the inside of the magnetic tape device 20) and when the magnetic tape cartridge 10 is ejected outside the magnetic tape device 20.

The sensor 64 detects whether the magnetic tape cartridge 10 has been ejected to the slot side of the external unit 30 or detects whether the magnetic tape cartridge 10 has been inserted into the external unit 30. The sensor 65 detects whether the belts 61a and 61b have released the hold of the magnetic tape cartridge 10, and the sensor 66 detects whether the belts 61a and 61b have held the magnetic tape cartridge 10.

The storage-medium conveying mechanism 60 conveys the magnetic tape cartridge 10 from the storage slot opened by the storage-slot open/close mechanism 50 to the inside of the magnetic tape device 20 when of the magnetic tape cartridge 10 having been inserted into the external unit 30 is verified to be legitimate by the verification mechanism 40. More specifically, the storage-medium conveying mechanism 60 causes the belts 61a and 61b to hold the magnetic tape cartridge 10 from its both sides, and causes the belt drive motor 62 to rotate the belts 61a and 61b, to thereby convey the magnetic tape cartridge 10 to the inside of the magnetic tape device 20.

As shown in FIG. 9, the external unit 30 is configured by combining the verification mechanism 40, the storage-slot open/close mechanism 50, the storage-medium conveying mechanism 60, and other components, inside the box-shaped unit. Furthermore, a sensor 71 and a sensor 72 shown in FIG. 9 are explained below. The sensor 71 detects whether the magnetic tape cartridge 10 has been ejected from the inside of the magnetic tape device 20. The sensor 72 detects whether the magnetic tape cartridge 10 has been set in a position where it is ready to be stored inside the magnetic tape device 20.

As shown in FIG. 10, the external unit 30 has two slots, for inserting the magnetic tape cartridge 10, vertically provided on the front thereof, which are the slot 31a on the upper side and the slot 31b on the lower. Therefore, the external unit 30 has the mechanisms on the upper side and the lower side, which are perfectly the same as each other. Therefore, the upper mechanism of the two is explained below.

The external unit 30 is configured by combining the verification mechanism 40, the storage-slot open/close mechanism 50, the storage-medium conveying mechanism 60, and other components, in their positional relation as shown in FIG. 10. For convenience in explanation, two magnetic tape cartridges 10 are shown in FIG. 10. The two show how the magnetic tape cartridge 10 is conveyed. More specifically, the magnetic tape cartridge 10 inserted into the external unit 30 is conveyed from the one on the left side in FIG. 10 to the one on the right side therein, in other words, the magnetic tape cartridge 10 is conveyed from the slot side of the external unit 30 to the storage slot side of the magnetic tape device 20. It is noted that the sensor 64, the sensor 71, and the sensor 72 correspond to the sensor 64, the sensor 71, and the sensor 72 of FIG. 9.

As explained above, the external unit 30 includes the verification mechanism 40, the storage-slot open/close mechanism 50, the storage-medium conveying mechanism 60, and other components, and also includes the sequencer 21 used as a device for controlling operations between these mechanisms and components. As shown in FIG. 4, the sequencer 21 is accommodated in the cabinet attached to the right part of the magnetic tape device 20. The sequencer 21 is a computer specific to implementation of sequence control by issuing an instruction (e.g., "ON", "OFF") to an output device in response to an instruction signal (e.g., "ON", "OFF") of an input device to the sequencer 21. The content of control is written in Central Processing Unit (CPU) of the sequencer 21 as a program written in specific instruction word. A control flow by the sequencer 21 is explained in detail below with reference to FIG. 11 to FIG. 18.

A flow as an aspect where the external unit for the storage-medium storage device according to the first embodiment is used is explained below. More specifically, the flow shows from when the magnetic tape cartridge 10 is inserted into the external unit 30 until the magnetic tape cartridge 10 is set in a position where it is ready to be stored inside the magnetic tape device 20.

As shown in FIG. 11, the RFID tag 11 is mounted on the magnetic tape cartridge 10. The RFID tag 11 stores individual information for the magnetic tape cartridge 10. The magnetic tape cartridge 10 with the RFID tag 11 is inserted from the slot of the external unit 30 (see (1) of FIG. 11). At this time, the storage-slot open/close mechanism 50 of the external unit 30 rotates the shutter 51 to cause the storage slot to be closed, and the storage-medium conveying mechanism 60 laterally opens the belts 61a and 61b in the above state, where the hold to the magnetic tape cartridge 10 is released.

Subsequently, the external unit 30 detects the state where the magnetic tape cartridge 10 has been inserted into the external unit 30 using the sensor 64, communicates with the RFID tag 11 on the magnetic tape cartridge 10 via the antenna 41 of the verification mechanism 40, and verifies legitimacy of the magnetic tape cartridge 10 using the individual information for the magnetic tape cartridge 10 stored in the RFID tag 11 (See (2) of FIG. 11). For example, the RFID tag 11 stores a specific identification number indicating the creator of the magnetic tape cartridge 10. Therefore, the verification mechanism 40 that communicates with the RFID tag 11 compares the specific identification number with an identification number preset by the user to determine whether these two match each other. If it is determined that these two match, then it is determined that the magnetic tape cartridge 10 with the RFID tag 11 is created by the authorized creator and should be handled by the magnetic tape device 20, and the legitimacy of the magnetic tape cartridge 10 can thereby be verified.

The sensor 64 detects that the magnetic tape cartridge 10 has been inserted into the external unit 30 in the above manner, and the external unit 30 causes the belts 61a and 61b of the storage-medium conveying mechanism 60 to hold the magnetic tape cartridge 10 from its both sides based on the condition that the legitimacy of the magnetic tape cartridge 10 is verified by the verification mechanism 40 (See (3) of FIG. 11).

Then, the external unit 30 causes the shutter drive motor 52 to rotate the shutter 51 of the storage-slot open/close mechanism 50 attached near the storage slot of the magnetic tape device 20, based on the condition that the magnetic tape cartridge 10 is held by the storage-medium conveying mechanism 60, to thereby open the storage slot of the magnetic tape device 20 (See (4) of FIG. 11).

The external unit 30 causes the belt drive motor 62 to rotate the belts 61a and 61b that are holding the magnetic tape cartridge 10, to thereby convey the magnetic tape cartridge 10 to the inside of the magnetic tape device 20 (See (5) of FIG. 11). The external unit 30 detects, using the sensor 72, whether the magnetic tape cartridge 10 is set in a predetermined position in the magnetic tape device 20 (position where the magnetic tape cartridge is ready to be stored inside the magnetic tape device).

When detecting, through the sensor 72, that the magnetic tape cartridge 10 has been set in the predetermined position in the magnetic tape device 20, the external unit 30 causes the shutter drive motor 52 to rotate the shutter 51 attached near the storage slot of the magnetic tape device 20, to thereby close the storage slot of the magnetic tape device 20 (See (6) of FIG. 11).

At the last step, the external unit 30 laterally opens the belts 61a and 61b of the storage-medium conveying mechanism 60 that hold the magnetic tape cartridge 10 based on the condition that the storage slot is closed by the storage-slot open/close mechanism 50, to thereby release the hold of the magnetic tape cartridge 10 (See (7) of FIG. 11). In this manner, the magnetic tape cartridge 10 becomes in a state where it is ready to be stored inside the magnetic tape device 20.

4: Processes Performed by External Unit

Figure 12:
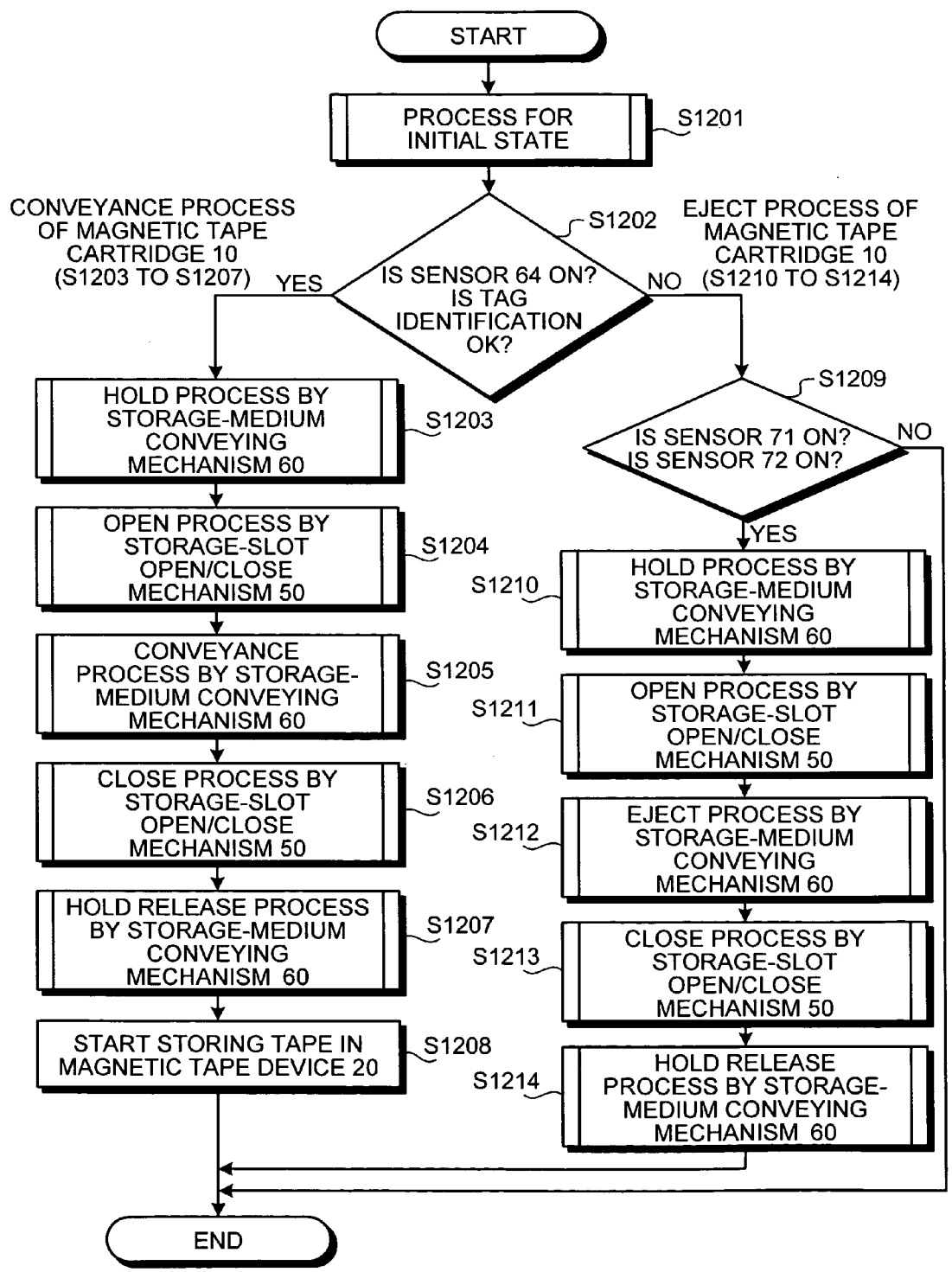
FIG. 12 is a flowchart of a procedure for processes by the external unit according to the first embodiment.
Figure 13:
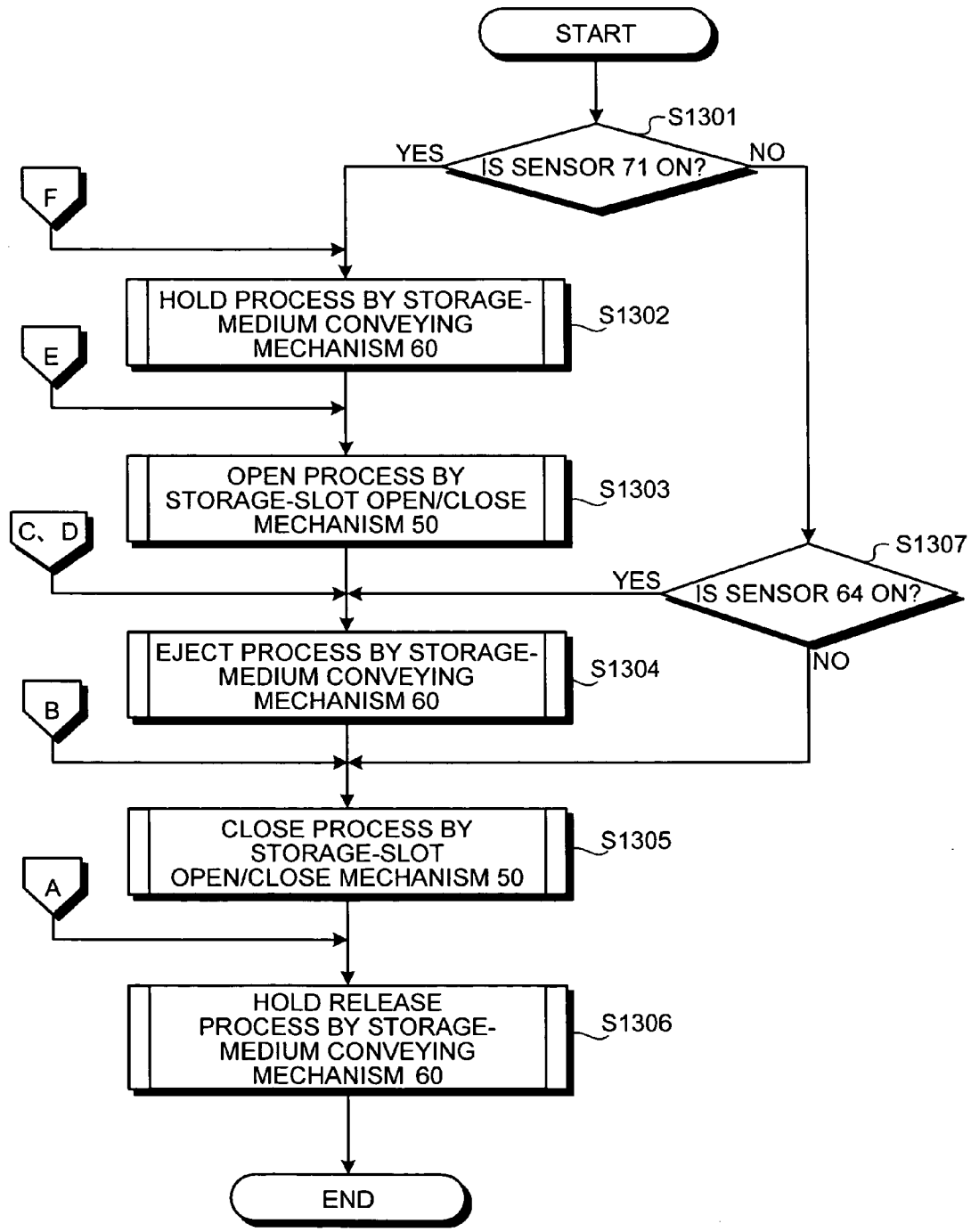
FIG. 13 is a flowchart of a procedure for processes for an initial state.
Figure 14:
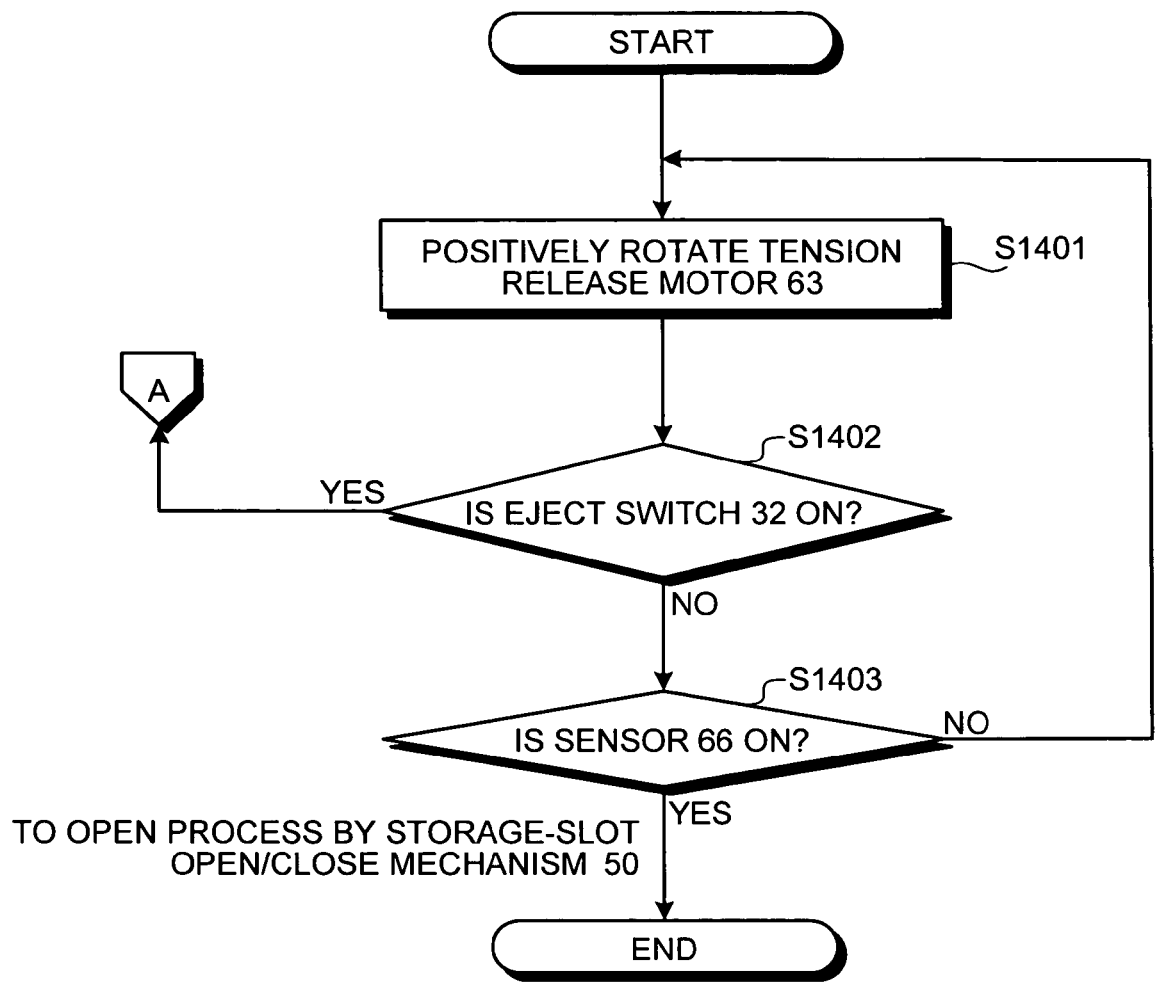
FIG. 14 is a flowchart of a procedure for a hold process performed by a storage-medium conveying mechanism.
Figure 15:
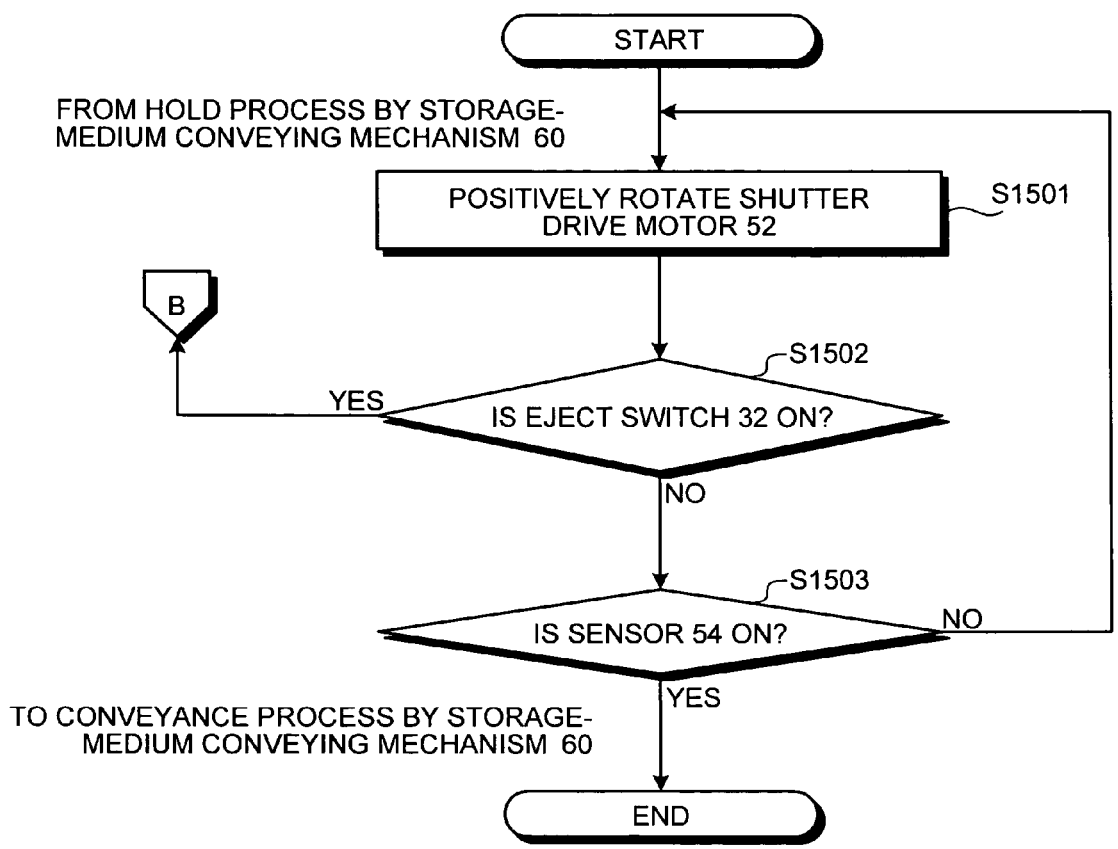
FIG. 15 is a flowchart of a procedure for an open process performed by a storage-slot open/close mechanism.
Figure 16:
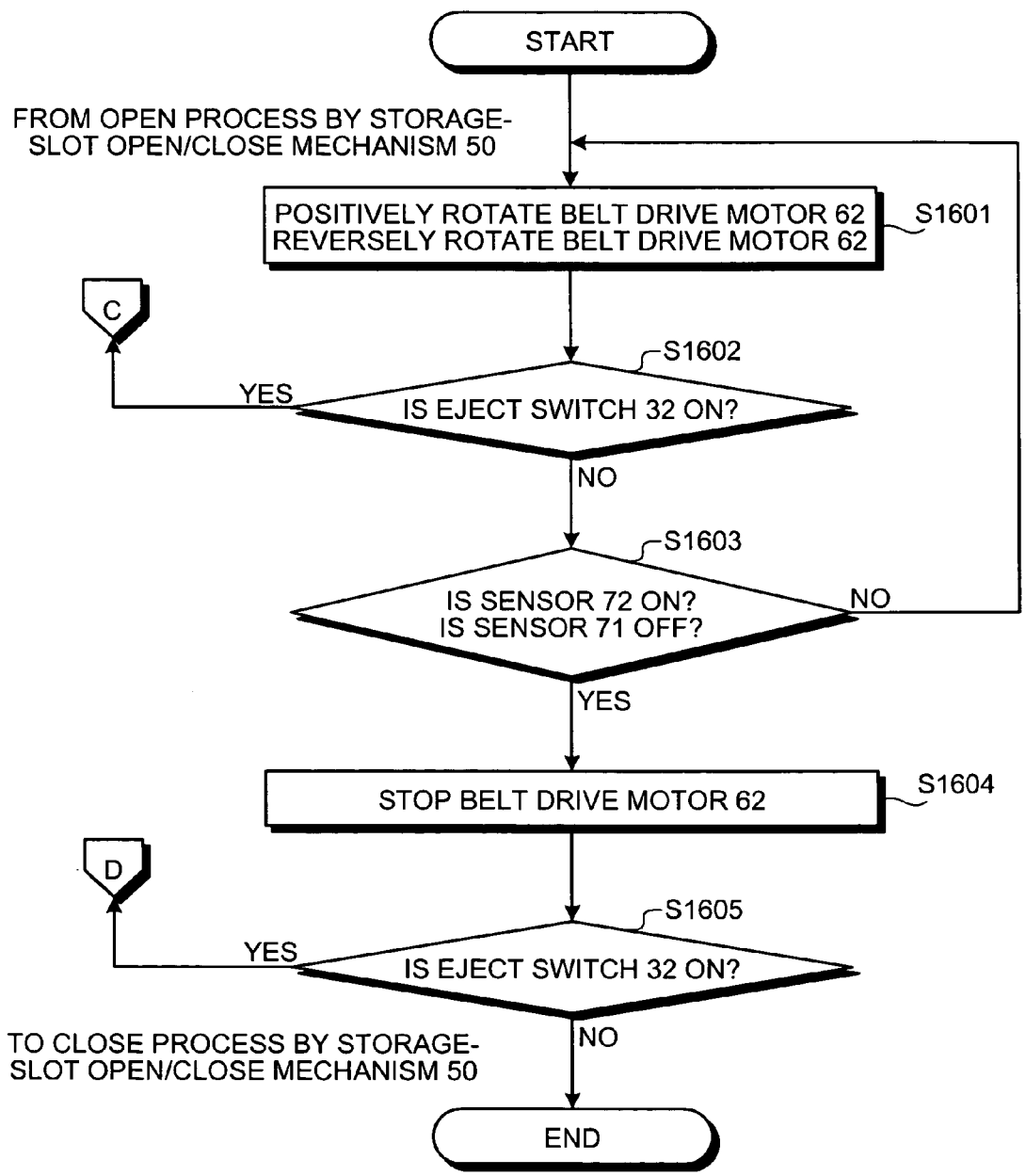
FIG. 16 is a flowchart of a procedure for a conveyance process performed by the storage-medium conveying mechanism.
Figure 17:
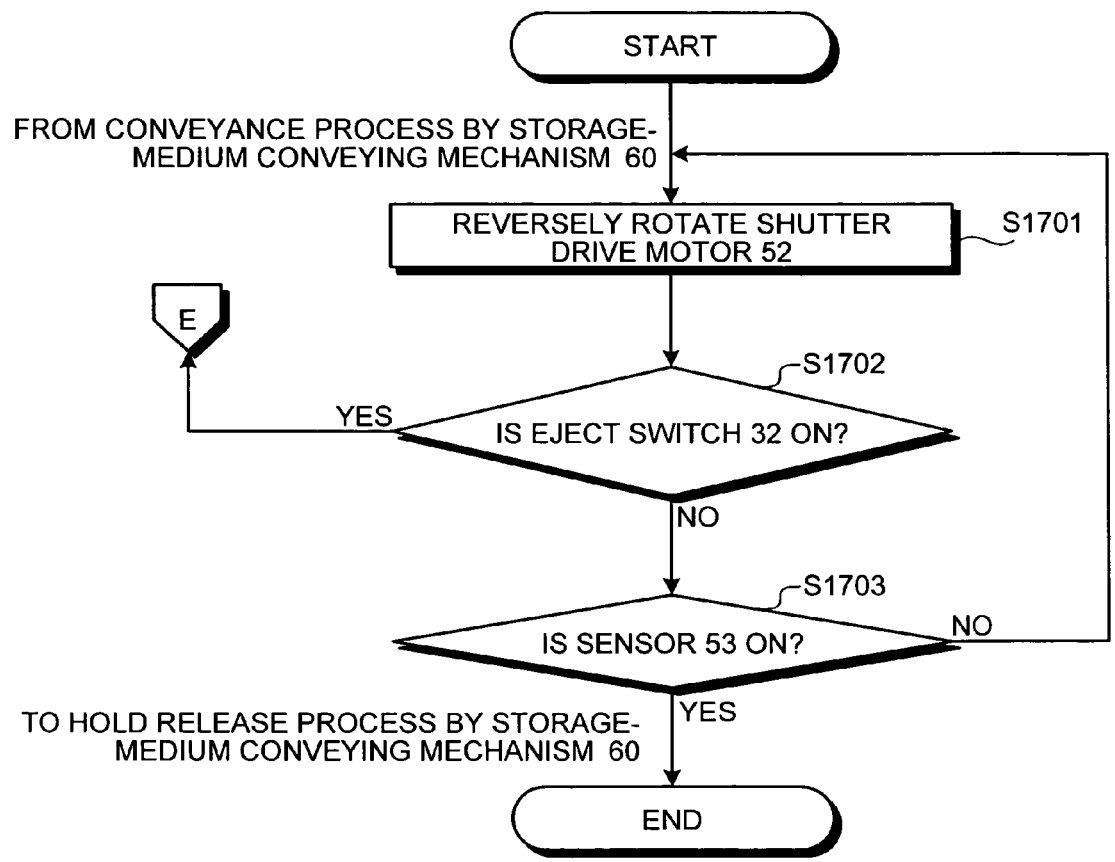
FIG. 17 is a flowchart of a procedure for a close process performed by the storage-slot open/close mechanism.

The processes performed by the external unit 30 according to the first embodiment are explained below with reference to FIG. 12 to FIG. 18. FIG. 12 is a flow channel of a process procedure performed by the external unit 30 according to the first embodiment, FIG. 13 is a flowchart of a process procedure for returning to an initial state, and FIG. 14 is a flowchart of a procedure for a hold process performed by the storage-medium conveying mechanism 60. FIG. 15 is a flowchart of a procedure for an open process performed by the storage-slot open/close mechanism 50, FIG. 16 is a flowchart of a procedure for a conveyance process performed by the storage-medium conveying mechanism 60, FIG. 17 is a flowchart of a procedure for a close process performed by the storage-slot open/close mechanism 50, and FIG. 18 is a flowchart of a procedure for a hold release process performed by the storage-medium conveying mechanism 60.

As shown in FIG. 12, when the power to the external unit 30 is turned ON by the user, the external unit 30 first performs the processes for an initial state explained with reference to FIG. 13 (step S1201). When the processes for the initial state are ended, the storage-slot open/close mechanism 50 of the external unit 30 rotates the shutter 51 to close the storage slot, and the storage-medium conveying mechanism 60 laterally opens the belts 61a and 61b.

Then, the external unit 30 determines whether the sensor 64 which forms the storage-medium conveying mechanism 60 is in an ON state and whether identification performed by the antenna 41 and the reader-writer 42, which form the verification mechanism 40, is in an OK state (step S1202). If the sensor 64 is in the ON state and the identification is in the OK state (step S1202, Yes), the process proceeds to a conveyance process for the magnetic tape cartridge 10 (steps S1203 to S1207). More specifically, the ON state of the sensor 64 indicates that the magnetic tape cartridge 10 has been inserted into the external unit 30, and the OK state of the identification indicates that the verification mechanism 40 verifies the legitimacy of the magnetic tape cartridge 10 (e.g., it is created by an authorized creator). If both of the states are determined as above, the external unit 30 proceeds to the conveyance process to store the magnetic tape cartridge 10 in the magnetic tape device 20.

The conveyance process of the magnetic tape cartridge 10 is briefly explained below. The storage-medium conveying mechanism 60 holds the magnetic tape cartridge 10 from its both sides by the belts 61a and 61b as explained later with reference to FIG. 14 (step S1203).

The storage-slot open/close mechanism 50 rotates the shutter 51 to thereby open the storage slot based on the condition that the magnetic tape cartridge 10 is held by the storage-medium conveying mechanism 60, as explained later with reference to FIG. 15 (step S1204).

When the storage-slot open/close mechanism 50 rotates the shutter 51 to open the storage slot, the storage-medium conveying mechanism 60 causes the belts 61a and 61b, which hold the magnetic tape cartridge 10 at step S1203, to rotate, and thereby conveys the magnetic tape cartridge 10 to the inside of the magnetic tape device 20, as explained later with reference to FIG. 16 (step S1205).

When the magnetic tape cartridge 10 is conveyed to the inside of the magnetic tape device 20 by the storage-medium conveying mechanism 60, the storage-slot open/close mechanism 50 rotates the shutter 51 to thereby close the storage slot, as explained later with reference to FIG. 17 (step S1206).

The storage-medium conveying mechanism 60 holds the magnetic tape cartridge 10 at step S1203 and releases the hold of the magnetic tape cartridge 10 conveyed at step S1205 based on the condition that the shutter 51 is rotated by the storage-slot open/close mechanism 50 to thereby close the storage slot, as explained later with reference to FIG. 18 (step S1207).

The conveyance process of the magnetic tape cartridge 10 is performed in the above manner (steps S1203 to S1207), and the magnetic tape cartridge 10 is thereby ready to be stored in the magnetic tape device 20. Therefore, the external unit 30 starts the operation for storage thereof in the magnetic tape device 20 (step S1208).

The case where the determination at step S1202 is performed in the following manner is explained below. At step S1202, the determination is performed on the sensor 64 that forms the storage-medium conveying mechanism 60 and the determination is also performed on the antenna 41 and the reader-writer 42 that form the verification mechanism 40, and it is determined that the sensor 64 is in the OFF state or the identification is in an NG (out of order) state (step S1202, No).

At first, if the sensor 64 is in the OFF state or the identification is in the NG state (step S1202, No), the external unit 30 further determines whether the sensor 71 is in the ON state and the sensor 72 is in the ON state (step S1209). If the sensor 71 is in the ON state and the sensor 72 is in the ON state (step S1209, Yes), the process proceeds to the eject process of the magnetic tape cartridge 10 (steps S1210 to S1214). More specifically, the ON state of the sensor 71 indicates that the magnetic tape cartridge 10 has not been ejected yet from the inside of the magnetic tape device 20. The ON state of the sensor 72 indicates that the magnetic tape cartridge 10 has been set in the position where it is ready to be stored in the magnetic tape device 20. If both of the states are determined as above, the external unit 30 proceeds to the eject process to eject the magnetic tape cartridge 10 from the magnetic tape device 20.

The eject process of the magnetic tape cartridge 10 is briefly explained below. At first, the storage-medium conveying mechanism 60 holds the magnetic tape cartridge 10 from its both sides by the belts 61a and 61b, as explained later with reference to FIG. 14 (step S1210).

Then, the storage-slot open/close mechanism 50 rotates the shutter 51 to thereby open the storage slot based on the condition that the magnetic tape cartridge 10 is held by the storage-medium conveying mechanism 60, as explained later with reference to FIG. 15 (step S1211).

When the shutter 51 is made to rotate by the storage-slot open/close mechanism 50 to thereby open the storage slot, the storage-medium conveying mechanism 60 causes the belts 61a and 61b, which hold the magnetic tape cartridge 10 at step S1210, to rotate, and thereby ejects the magnetic tape cartridge 10 from the inside of the magnetic tape device 20 (step S1212).

When the magnetic tape cartridge 10 is ejected to the outside of the magnetic tape device 20 by the storage-medium conveying mechanism 60, the storage-slot open/close mechanism 50 rotates the shutter 51 to close the storage slot, as explained later with reference to FIG. 17 (step S1213).

The storage-medium conveying mechanism 60 holds the magnetic tape cartridge 10 at step S1210 and releases the hold of the magnetic tape cartridge 10 ejected at step S1212, based on the condition that the shutter 51 is rotated by the storage-slot open/close mechanism 50 to close the storage slot, as explained later with reference to FIG. 18 (step S1214).

If the sensor 71 is in the OFF state or the sensor 72 is in the OFF state (step S1209, No), the external unit 30 ends the process.

The processes for the initial state are explained below with reference to FIG. 13 (step S1201). As shown in FIG. 13, when the power to the external unit 30 is turned ON by the user, the external unit 30 determines whether the sensor 71 is in an ON state. If the sensor 71 is in the ON state (step S1301, Yes), the magnetic tape cartridge 10 has not been ejected yet from the inside of the magnetic tape device 20. Therefore, the storage-medium conveying mechanism 60 causes the belts 61a and 61b to hold the magnetic tape cartridge 10 from its both sides, as explained later with reference to FIG. 14 (step S1302).

The storage-slot open/close mechanism 50 rotates the shutter 51 to open the storage slot based on the condition that the magnetic tape cartridge 10 is held by the storage-medium conveying mechanism 60, as explained later with reference to FIG. 15 (step S1303).

When the shutter 51 is rotated by the storage-slot open/close mechanism 50 to open the storage slot, the storage-medium conveying mechanism 60 causes the belts 61a and 61b, which hold the magnetic tape cartridge 10 at step S1302, to rotate, and ejects the magnetic tape cartridge 10 from the inside of the magnetic tape device 20 (step S1304).

When the magnetic tape cartridge 10 is ejected from the inside of the magnetic tape device 20 by the storage-medium conveying mechanism 60, the storage-slot open/close mechanism 50 rotates the shutter 51 to close the storage slot, as explained later with reference to FIG. 17 (step S1305).

The storage-medium conveying mechanism 60 holds the magnetic tape cartridge 10 at step S1302 and releases the hold of the magnetic tape cartridge 10 ejected at step S1304 based on the condition that the shutter 51 is rotated by the storage-slot open/close mechanism 50 to close the storage slot, as explained later with reference to FIG. 18 (step S1306).

If it is determined at step S1301 that the sensor 71 is in the OFF state (step S1301, No), it is further determined whether the sensor 64 is in the ON state (step S1307). If the sensor 64 is in the ON state (step S1307, Yes), the external unit 30 allows the storage-medium conveying mechanism 60 to perform the eject process (step S1304), the storage-slot open/close mechanism 50 to perform the close process (step S1305), and the storage-medium conveying mechanism 60 to perform the hold release process in this order (step S1306).

If it is determined at step S1301 that the sensor 71 is in the OFF state (step S1301, No), it is further determined whether the sensor 64 is in the ON state (step S1307). If the sensor 64 is in the OFF state (step S1307, No), the external unit 30 allows the storage-slot open/close mechanism 50 to perform the close process (step S1305) and the storage-medium conveying mechanism 60 to perform the hold release process in this order (step S1306).

As explained above, in both cases, the close process by the storage-slot open/close mechanism 50 (step S1305) and the hold release process by the storage-medium conveying mechanism 60 (step S1306) are always executed. Therefore, when the processes for the initial state are ended, the storage-slot open/close mechanism 50 of the external unit 30 rotates the shutter 51 to close the storage slot, and the storage-medium conveying mechanism 60 laterally opens the belts 61a and 61b.

Alphabetical letters A to F as shown in FIG. 13 represent positions indicating predetermined processes in the processes for the initial state. More specifically, when the eject switch 32 (32a or 32b) is pressed during any other process, the process is returned to any corresponding process in the predetermined processes, as explained later with reference to FIG. 14 to FIG. 18.

The hold process performed by the storage-medium conveying mechanism 60 is explained below with reference to FIG. 14 (step S1203, step S1210, and step S1302). At first, the storage-medium conveying mechanism 60 positively rotates the tension release motor 63 and causes the belts 61a and 61b to hold the magnetic tape cartridge 10 from its both sides (step S1401).

Then, the storage-medium conveying mechanism 60 determines whether the eject switch 32 is in the ON state (step S1402). If it is in the ON state (step S1402, Yes), the process is returned to the predetermined process (A) in the processes for the initial state. But, if it is in the OFF state (step S1402, No), it is further determined whether the sensor 66 is in the ON state (step S1403).

If the sensor 66 is in the ON state (step S1403, Yes), this indicates that the magnetic tape cartridge 10 is held by the belts 61a and 61b. Therefore, the external unit 30 proceeds to the open process performed by the storage-slot open/close mechanism 50 (step S1204, step S1211, and step S1303). But, if the sensor 66 is in the OFF state (step S1403, No), this indicates that the magnetic tape cartridge 10 is released by the belts 61a and 61b. Therefore, the external unit 30 returns to the process where the tension release motor 63 is positively rotated (step S1401).

The open process performed by the storage-slot open/close mechanism 50 is explained below with reference to FIG. 15 (step S1204, step S1211, and step S1303). At first, the storage-slot open/close mechanism 50 positively rotates the shutter drive motor 52 to rotate the shutter 51, and thereby opens the storage slot (step S1501).

Then, the storage-slot open/close mechanism 50 determines whether the eject switch 32 is in the ON state (step S1502). If it is in the ON state (step S1502, Yes), the process is returned to the predetermined process (B) in the processes for the initial state. But, if it is in the OFF state (step S1502, No), it is further determined whether the sensor 54 is in the ON state (step S1503).

If the sensor 54 is in the ON state (step S1503, Yes), the shutter 51 is made to rotate, so that the storage slot is opened. Therefore, the external unit 30 proceeds to the conveyance process performed by the storage-medium conveying mechanism 60 (step S1205). But, if the sensor 54 is in the OFF state (step S1503, No), the shutter 51 is made to rotate, so that the storage slot is opened. Therefore, the external unit 30 returns to the process where the shutter drive motor 52 is positively rotated (step S1501).

The conveyance process performed by the storage-medium conveying mechanism 60 is explained below with reference to FIG. 16 (step S1205). The storage-medium conveying mechanism 60 causes the belt drive motor 62 to rotate the belts 61a and 61b in such a manner that one of them is positively rotated and the other is reversely rotated, and thereby conveys the magnetic tape cartridge 10 to the inside of the magnetic tape device 20 (step S1601).

Then, the storage-medium conveying mechanism 60 determines whether the eject switch 32 is in the ON state (step S1602). If it is in the ON state (step S1602, Yes), the process is returned to the predetermined process (C) in the processes for the initial state. But, if it is in the OFF state (step S1602, No), it is further determined whether the sensor 72 is in the ON state and the sensor 71 is in the OFF state (step S1603). If the sensor 72 is in the ON state and the sensor 71 is in the OFF state (step S1603, Yes), the storage-medium conveying mechanism 60 stops the belt drive motor 62 (step S1604). More specifically, if the sensor 72 is in the ON state, the magnetic tape cartridge 10 has been set in the position where it is ready to be stored inside the magnetic tape device 20. If the sensor 71 is in the OFF state, the magnetic tape cartridge 10 has not been ejected from the inside of the magnetic tape device 20. In both cases, the external unit 30 stops the belt drive motor 62.

Then, the storage-medium conveying mechanism 60 determines again whether the eject switch 32 is in the ON state (step S1605). If it is in the ON state (step S1605, Yes), the process is returned to the predetermined process (D) in the processes for the initial state. But, if it is in the OFF state (step S1605, No), the process proceeds to the close process performed by the storage-slot open/close mechanism 50 (step S1206, step S1213, and step S1305).

The close process performed by the storage-slot open/close mechanism 50 is explained below with reference to FIG. 17 (step S1206, step S1213, and step S1305). At first, the storage-slot open/close mechanism 50 reversely rotates the shutter drive motor 52 to rotate the shutter 51, and thereby closes the storage slot (step S1701).

Then, the storage-slot open/close mechanism 50 determines whether the eject switch 32 is in the ON state (step S1702). If it is in the ON state (step S1702, Yes), the process is returned to the predetermined process (E) in the processes for the initial state. But, if it is in the OFF state (step S1702, No), it is further determined whether the sensor 53 is in the ON state (step S1703).

If the sensor 53 is in the ON state (step S1703, Yes), the shutter 51 is made to rotate, so that the storage slot is closed. Therefore, the external unit 30 proceeds to the hold release process performed by the storage-medium conveying mechanism 60 (step S1207, step S1214, and step S1306). But, if the sensor 53 is in the OFF state (step S1703, No), the shutter 51 is made to rotate, so that the storage slot is opened. Therefore, the external unit 30 returns to the process where the shutter drive motor 52 is reversely rotated (step S1701).

The hold release process performed by the storage-medium conveying mechanism 60 is explained below with reference to FIG. 18 (step S1207, step S1214, and step S1306). At first, the storage-medium conveying mechanism 60 positively rotates the tension release motor 63 to thereby release the hold of the magnetic tape cartridge 10 (step S1801).

Then, the storage-medium conveying mechanism 60 determines whether the eject switch 32 is in the ON state (step S1802). If it is in the ON state (step S1802, Yes), the process is returned to the predetermined process (F) in the processes for the initial state. But, if it is in the OFF state (step S1802, No), it is further determined whether the sensor 65 is in the ON state (step S1803).

If the sensor 65 is in the ON state (step S1803, Yes), the magnetic tape cartridge 10 is released by the belts 61a and 61b. Therefore, the external unit 30 proceeds to the process of starting storage thereof in the magnetic tape device 20 (step S1208). But, if the sensor 65 is in the OFF state (step S1803, No), the magnetic tape cartridge 10 is held by the belts 61a and 61b. Therefore, the external unit 30 returns to the process where the tension release motor 63 is positively rotated (step S1801).

According to the first embodiment, the storage slot is opened when the storage medium is verified to be legitimate by the external unit. Then, the storage medium inserted in the storage slot is conveyed to the inside of the storage-medium storage device. Because the external unit can be easily attached to existing storage-medium storage devices, security can be easily ensured without remodeling the existing storage-medium storage devices.

According to the first embodiment, the storage slot open/close unit opens the storage slot based on the condition that the storage medium is held by the storage medium conveying unit. Therefore, the external unit for the storage-medium storage device can prevent the storage medium from being stored in the storage-medium storage device in malicious mode (e.g., behavior such that after the storage slot is opened, the storage medium verified is taken out and another storage medium not verified is inserted through the storage slot). This allows security related to the storage-medium storage device to be more sufficiently ensured.

According to the first embodiment, the storage medium conveying unit releases the hold of the storage medium based on the condition that the storage slot is closed by the storage slot open/close unit. Therefore, the external unit for the storage-medium storage device can prevent the storage medium from being stored in the storage-medium storage device in malicious mode (e.g., behavior such that after the storage slot is opened and the storage medium verified is conveyed to the inside of the storage-medium storage device, the storage medium verified is taken out and another storage medium not verified is put inside the storage-medium storage device). This allows security related to the storage-medium storage device to be more sufficiently ensured.

According to the first embodiment, the verification unit verifies legitimacy of the storage medium using the information stored on the RFID tag mounted on the storage medium. Therefore, the external unit for the storage-medium storage device can verify the legitimacy of the storage medium at high speed using radio communication, and can identify the storage medium for various purposes using more information stored on the tag. This allows security related to the storage-medium storage device to be more highly used.

Although the external unit for the storage-medium storage device according to the first embodiment is explained above, the present invention may be implemented in various forms other than the first embodiment. A different embodiment is, therefore, explained below as an external unit for the storage-medium storage device according to a second embodiment of the present invention.

In the first embodiment, the case where the magnetic tape cartridge is used as the storage medium and the magnetic tape device is used as the storage-medium storage device is explained. However, the present invention is not limited to this case, and therefore, the present invention is also applicable to the case below. The case is such that another storage medium is used as the storage medium such as a Floppy(TM) disk, a semiconductor disk, a Zip, a compact disk-read only memory (CD-ROM), a magneto-optical (MO) disk, and a digital versatile disk (DVD)-ROM, and that another storage-medium storage device for the storage media is used as the storage-medium storage device such as a Floppy(TM) disk drive, a semiconductor disk drive, a Zip drive, a CD-ROM drive, an MO drive, and a DVD-ROM drive.

In the first embodiment, the unit of using information stored on the RFID tag as the verification unit is explained above, but the present invention is not limited to this unit. Therefore, any unit may be used if the unit uses information for identification such as information stored in a bar code.

In the first embodiment, the unit of using the shutter as the storage slot open/close unit is explained above, but the present invention is not limited to this unit. Therefore, any unit may be used if the unit can open and close the storage slot.

In the first embodiment, the unit of using the belt as the storage medium conveying unit is explained above, but the present invention is not limited to this unit. Therefore, any unit may be used if the unit can covey the storage medium.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An external unit that can be externally attached to a storage-medium storage device, wherein the storage-medium storage device includes a storage slot for inserting a storage medium and a storage mechanism for storing the storage medium inserted from the storage slot, the external unit comprising:
   a verification unit that verifies whether a storage medium that is about to be inserted in the storage slot of the storage-medium storage device is legitimate; and
   an open/close unit that opens the storage slot so that the storage medium can be inserted in the storage slot only upon the verifying unit verifying that the storage medium is legitimate.

2. The external unit according to claim 1, further comprising a conveying unit that conveys the storage medium from the storage slot to the storage mechanism when the storage medium is inserted into the storage slot.

3. The external unit according to claim 2, wherein the open/close unit opens the storage slot only when the storage medium has been held by the conveying unit.

4. The external unit according to claim 3, wherein the conveying unit releases the storage medium only when the storage slot is closed by the open/close unit.

5. The external unit according to claim 1, wherein the verification unit verifies whether a storage medium is legitimate based on information in a radio frequency identification tag attached to the storage medium.

* * * * *